US012693807B2

(12) United States Patent
Yang et al.

(10) Patent No.: US 12,693,807 B2
(45) Date of Patent: Jul. 28, 2026

(54) AGGREGATING UNALIGNED SEQUENTIAL WRITE REQUESTS

(71) Applicant: Micron Technology, Inc., Boise, ID (US)

(72) Inventors: Zhijia Yang, China Suzhou (CN); Xingru Song, Shanghai (CN); Zhuo Zhang, Shanghai (CN); Zhenfa Ji, Shanghai (CN); Mayo Ma, Suzhou City (CN); Defu Wang, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 41 days.

(21) Appl. No.: 18/890,109

(22) Filed: Sep. 19, 2024

(65) Prior Publication Data

US 2026/0079644 A1      Mar. 19, 2026

(51) Int. Cl.
*G06F 3/06* (2006.01)
(52) U.S. Cl.
CPC .......... *G06F 3/0659* (2013.01); *G06F 3/0604* (2013.01); *G06F 3/0679* (2013.01)

(58) Field of Classification Search
CPC ..... G06F 3/0659; G06F 3/0604; G06F 3/0679
See application file for complete search history.

(56) References Cited

U.S. PATENT DOCUMENTS

| | | | |
|---|---|---|---|
| 11,403,034 B1* | 8/2022 | Moertl | .................. G06F 3/0679 |
| 2018/0018101 A1* | 1/2018 | Benisty | ................ G06F 3/0659 |

\* cited by examiner

*Primary Examiner* — Francisco A Grullon
(74) *Attorney, Agent, or Firm* — Schwegman Lundberg & Woessner, P.A.

(57) ABSTRACT

A system component, such as a memory sub-system controller, aggregates multiple sequential write requests. The controller receives an individual write request from a host system to program a set of data and determines that an aggregation cache has space remaining for the set of data. The controller aggregates the set of data into the aggregation cache in response to determining that the aggregation cache has space remaining for the set of data and transfers data stored in the aggregation cache to a portion of a set of memory components instead of modifying a block of data read from the set of memory components in response to determining that an amount of data stored in the aggregation cache has reached a specified size.

20 Claims, 5 Drawing Sheets

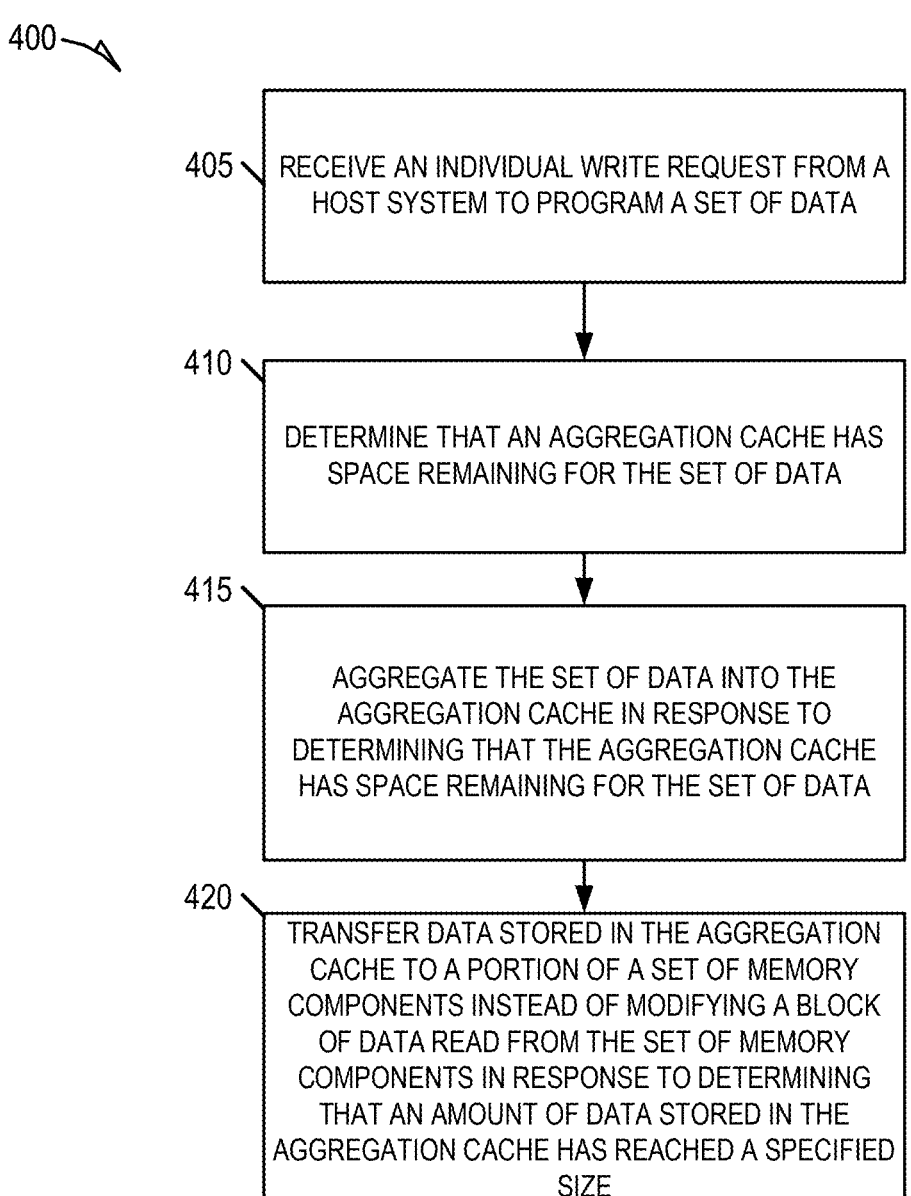

400

405   RECEIVE AN INDIVIDUAL WRITE REQUEST FROM A HOST SYSTEM TO PROGRAM A SET OF DATA

410   DETERMINE THAT AN AGGREGATION CACHE HAS SPACE REMAINING FOR THE SET OF DATA

415   AGGREGATE THE SET OF DATA INTO THE AGGREGATION CACHE IN RESPONSE TO DETERMINING THAT THE AGGREGATION CACHE HAS SPACE REMAINING FOR THE SET OF DATA

420   TRANSFER DATA STORED IN THE AGGREGATION CACHE TO A PORTION OF A SET OF MEMORY COMPONENTS INSTEAD OF MODIFYING A BLOCK OF DATA READ FROM THE SET OF MEMORY COMPONENTS IN RESPONSE TO DETERMINING THAT AN AMOUNT OF DATA STORED IN THE AGGREGATION CACHE HAS REACHED A SPECIFIED SIZE

*FIG. 4*

AGGREGATING UNALIGNED SEQUENTIAL WRITE REQUESTS

TECHNICAL FIELD

Examples of the disclosure relate generally to memory sub-systems and, more specifically, to processing write requests received from a host system.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data on the memory components and to retrieve data from the memory components.

BRIEF DESCRIPTION OF THE DRAWINGS

The present disclosure will be understood more fully from the detailed description given below and from the accompanying drawings of various embodiments of the disclosure.

FIG. 4 is a flow diagram of an example method to perform media management operations, in accordance with some examples.

DETAILED DESCRIPTION

Figure 1:
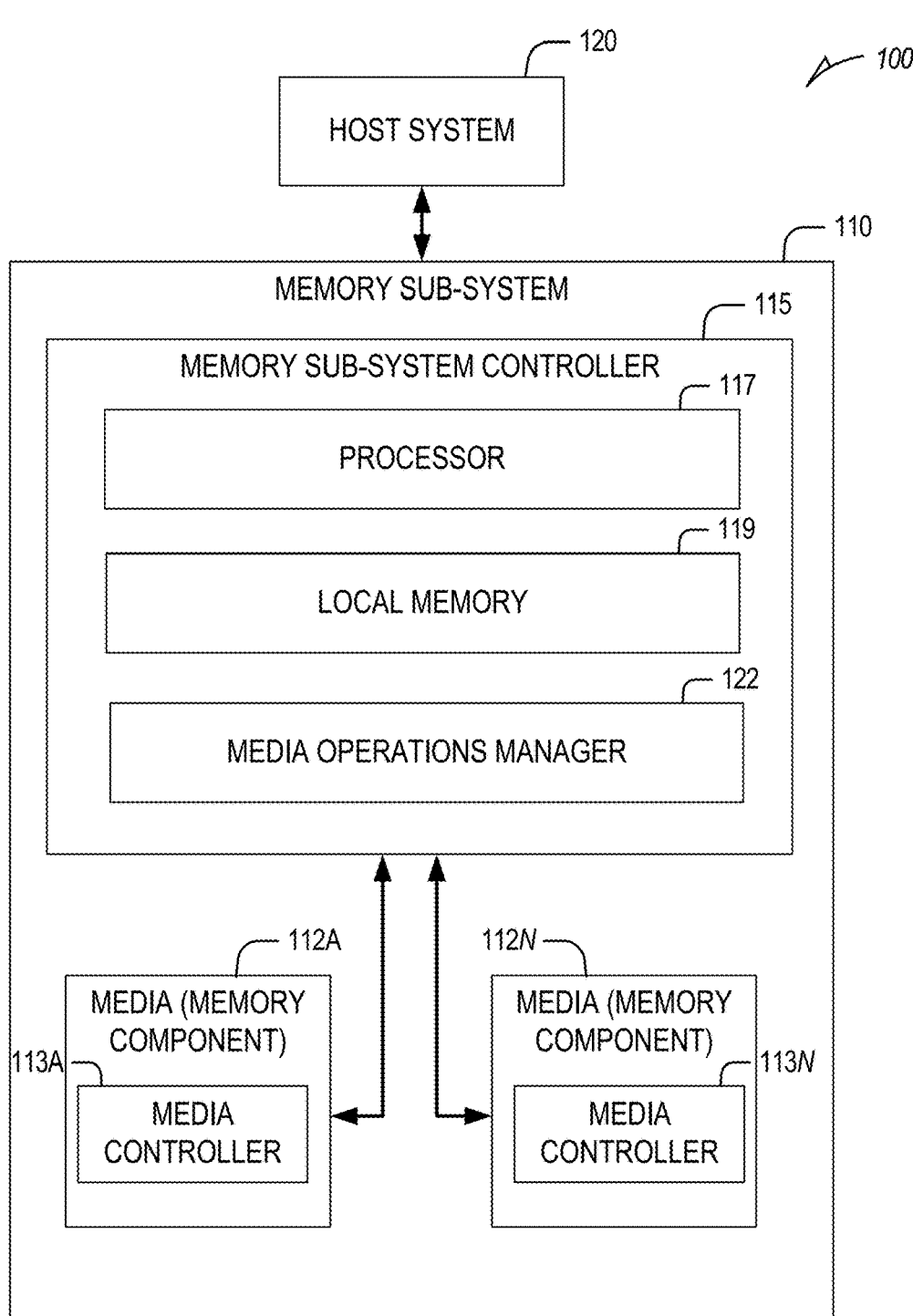
FIG. 1 is a block diagram illustrating an example computing environment including a memory sub-system, in accordance with some examples.

The present disclosure configures a system component, such as a memory sub-system controller, to process multiple write requests received from a host system. The controller can receive a write request from a host system. The controller can aggregate the data received in that write request with data received from other write requests (e.g., previously received write requests or subsequently received write requests). If the data aggregated from the multiple write requests reaches a bundle unit size (e.g., 16 KB) before an internal read for a block of data is completed, the data is transferred to the memory components (e.g., immediately and without waiting for the internal read operation to complete). This expedites the process of satisfying multiple write requests for unaligned data which improves the overall efficiency of operating the memory sub-system.

A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components, such as memory devices (e.g., memory dies) that store data. The host system can send access requests (e.g., write command, read command) to the memory sub-system, such as to store data at the memory sub-system and to read data from the memory sub-system. The data (or set of data) specified by the host is hereinafter referred to as "host data," "application data," or "user data."

The different memory components (e.g., memory blocks, sub-blocks, word lines, planes, memory dies, and so forth) can each store a respective read count value indicating the quantity or number of times the respective memory component has been read. This read count value can be compared against a read disturb condition criterion (e.g., a read count threshold) which can be used to control when read disturb scan operations are performed for the memory component. Read disturb scan operations involve reading data from one or more portions or specified word lines (WLs) of the memory component and determining whether a read bit error rate (RBER) of the read data transgresses a threshold. If so, the read-disturb scan operations refresh or fold the data from the memory component to another memory component. If not, the read-disturb scan operations continue monitoring and/or accessing a different memory component and/or memory block.

The memory sub-system can initiate media management operations, such as a write operation, on host data that is stored on a memory device. For example, firmware of the memory sub-system may re-write previously written host data from a location on a memory device to a new location as part of garbage collection management operations. The data that is re-written, for example as initiated by the firmware, is hereinafter referred to as "garbage collection data." "User data" can include host data and garbage collection data. "System data" hereinafter refers to data that is created and/or maintained by the memory sub-system for performing operations in response to host requests and for media management. Examples of system data include, and are not limited to, system tables (e.g., logical-to-physical address mapping table), data from logging, scratch pad data, etc.

Many different media management operations can be performed on the memory device. For example, the media management operations can include different scan rates, different scan frequencies, different wear leveling, different read disturb management (e.g., read disturb scan operations), different near miss error correction code (ECC), and/or different dynamic data refresh. Wear leveling ensures that all blocks in a memory component approach their defined erase-cycle budget at the same time, rather than some blocks approaching it earlier. Read disturb management counts all of the read operations to the memory component. If a certain threshold is reached, the surrounding regions are refreshed. Near-miss ECC refreshes all data read by the application that exceeds a configured threshold of errors. Dynamic data-refresh scan reads all data and identifies the error status of all blocks as a background operation. If a certain threshold of errors per block or ECC unit is exceeded in this scan-read, a refresh operation is triggered.

A memory device can be a non-volatile memory device. A non-volatile memory device is a package of one or more dice (or dies). Each die can be comprised of one or more planes. For some types of non-volatile memory devices (e.g., NAND devices), each plane is comprised of a set of physical blocks. For some memory devices, blocks are the smallest area than can be erased. Each block is comprised of a set of pages. Each page is comprised of a set of memory cells, which store bits of data. The memory devices can be raw memory devices (e.g., NAND), which are managed externally, for example, by an external controller. The memory devices can be managed memory devices (e.g., managed NAND), which is a raw memory device combined with a local embedded controller for memory management within the same memory device package.

In NAND flash memory, the process of handling multiple write requests involves a method known as read-modify-write, which can lead to significant inefficiencies and resource wastage. This method is necessitated by the architecture of NAND flash memory, where data is organized into blocks and each block is divided into pages. When data from multiple write requests is received and needs to be stored in a single block (often referred to as a bundle unit), the entire block needs to be first read, even if only a small portion of the block needs to be updated. After reading, the necessary modifications are made to the data in memory (the modify step), and then the entire block must be written back to the flash memory. This process is not only time-consuming, but also consumes a considerable amount of power which is an important factor in mobile and other battery-dependent devices. Additionally, NAND flash has a limited number of write cycles, meaning that each read-modify-write cycle contributes to the wear and tear of the memory, potentially reducing its lifespan. The inefficiency is compounded when the data to be written is smaller than the block size, leading to a situation where large blocks are being rewritten frequently for relatively small amounts of data. This not only slows down the system's performance due to the overhead involved in handling these operations but also leads to suboptimal utilization of the storage capacity, as the effective storage capacity is reduced by the overhead associated with managing these write operations.

Moreover, this method can lead to further inefficiencies in terms of data management and error handling. Since each block must be entirely rewritten, even a single bit error during the write process can necessitate the re-writing of large amounts of data, further increasing the time and resource consumption. This inefficiency in handling write requests in bundle units underscores the need for more advanced data management techniques in NAND flash memory, such as advanced wear-leveling algorithms, improved error correction codes, and more efficient block management strategies to optimize both the longevity and performance of the storage device. Certain systems collect data from multiple write requests into individual buffers. The data from each of the write requests is then aggregated into one of the individual buffers and is used to modify a block of data that is read from memory. Having to wait for the block of data to be read from memory and for the data from the write requests to be aggregated is inefficient and slows down satisfaction of the write requests. This leads to various inefficiencies and reduces performance of the memory sub-system.

Specifically, the disclosed techniques provide a memory controller that can process multiple write requests received from a host system. The memory controller can receive a write request from a host system. The memory controller can aggregate the data received in that write request with data received from other write requests (e.g., previously received write requests or subsequently received write requests). If the data aggregated from the multiple write requests reaches a bundle unit size (e.g., 16 KB) before an internal read for a block of data is completed, the memory controller transfers the data directly to a portion of the memory components (e.g., immediately and without waiting for the internal read operation to complete). This expedites the process of satisfying multiple write requests for unaligned data which improves the overall efficiency of operating the memory sub-system.

For some examples, the memory sub-system (e.g., memory sub-system controller) receives an individual write request from a host system to program a set of data. The controller can determine that an aggregation cache has space remaining for the set of data. The controller can aggregate the set of data into the aggregation cache in response to determining that the aggregation cache has space remaining for the set of data. The controller can transfer data stored in the aggregation cache to a portion of the set of memory components instead of modifying a block of data read from the set of memory components in response to determining that an amount of data stored in the aggregation cache has reached a specified size. In some cases, the memory sub-system includes a three-dimensional (3D) NAND device. The set of data can include 4 KB of data and the specified size includes 16 KB of data.

The individual write request can include a first write request. In such cases, the controller can generate an internal read request to obtain the block of data from the set of memory components in response to receiving the first write request. The controller can store the set of data in the aggregation cache in response to generating the internal read request. The controller can receive one or more write requests to program an additional set of data prior to completing the internal read request and can store the additional set of data in the aggregation cache in response to determining that the aggregation cache has space remaining for the additional set of data.

In some examples, the controller can determine that the amount of data stored in the aggregation cache has reached the specified size prior to completing the internal read request. The controller can set the internal read request to a dropped status to prevent completion of the internal read request in response to determining that the amount of data stored in the aggregation cache has reached the specified size prior to completing the internal read request. Setting to the dropped status can prevent operating on the block of data that is ultimately read from the memory components and can avoid consuming buffer space with the read block of data.

The controller can transfer the data stored in the aggregation cache to the portion of the set of memory components without performing a read, modify, write (read-modify-write) operation in response to determining that the amount of data stored in the aggregation cache has reached the specified size prior to completing the internal read request. In some cases (though not required), the controller can initialize a timer including a value representing an amount of time for completing the internal read request in response to receiving the first write request. In such cases, the controller can determine that the timer fails to reach the value to control setting the internal read request to the dropped status to prevent completion of the internal read request in response to receiving the one or more write requests. The block of data can include or correspond to the specified size. The specified size can correspond to a bundle unit of the set of memory components (which can be predetermined or user configurable). The bundle unit can include multiple transfer units. In certain cases, rather than using a timer, the controller stores data in the aggregation cache and issues a read request. The controller can continue storing additional data in the aggregation cache while the read request issued to the set of memory components is pending. In response to determining that the aggregation cache has reached a specified size before the initial read request is completed, the controller stores the data from the aggregation cache to the set of memory components without waiting for the read request to be completed.

In some examples, the controller stores a first set of data of a first write request in a first buffer. The first write request can include the individual write request. The controller can store a second set of data of a second write request in a second buffer and can store a third set of data of a third write request in a third buffer. The controller can combine the second set of data with the third set of data in the third buffer. In some cases, the controller can determine that the amount of data stored in the third buffer failed to reach the specified size prior to completion of reading the block of data. The controller stores a fourth set of data of a fourth write request in a fourth buffer and combines the first set of data with the second set of data, the third set of data, and the fourth set of data in the fourth buffer in response to determining that the amount of data stored in the third buffer failed to reach the specified size prior to completion of reading the block of data. The controller can drop a request to read the block of data and transfers data stored in the fourth buffer to the portion of the set of memory components in response to determining that the fourth buffer reached the specified size.

Though various examples are described herein as being implemented with respect to a memory sub-system (e.g., a controller of the memory sub-system), some or all of the portions of an example can be implemented with respect to a host system, such as a software application or an operating system of the host system.

FIG. 1 illustrates an example computing environment 100 including a memory sub-system 110, in accordance with some examples. The memory sub-system 110 can include media, such as memory components 112A to 112N (also hereinafter referred to as "memory devices"). The memory components 112A to 112N can be volatile memory devices, non-volatile memory devices, or a combination of such. The memory components 112A to 112N can be implemented by individual dies, such that a first memory component 112A can be implemented by a first memory die (or a first collection of memory dies) and a second memory component 112N can be implemented by a second memory die (or a second collection of memory dies).

In some examples, the memory sub-system 110 is a storage system. A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to a memory system. The memory system can include one or more memory sub-systems 110. In some examples, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, embedded computer (e.g., one included in a vehicle, industrial equipment, or a networked commercial device), or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. Examples of a physical host interface include, but are not limited to, a serial advanced technology attachment (SATA) interface, a peripheral component interconnect express (PCIe) interface, a compute express link (CXL), a universal serial bus (USB) interface, a Fibre Channel interface, a Serial Attached SCSI (SAS) interface, etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe or CXL interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes NOR- and (NAND)-type flash memory. Each of the memory components 112A to 112N can include one or more arrays of memory cells such as single-level cells (SLCs) or multi-level cells (MLCs) (e.g., TLCs or QLCs). In some examples, a particular memory component 112 can include both an SLC portion and an MLC portion of memory cells. Each of the memory cells can store one or more bits of data (e.g., blocks) used by the host system 120. Although non-volatile memory components such as NAND-type flash memory are described, the memory components 112A to 112N can be based on any other type of memory, such as a volatile memory.

In some examples, the memory components 112A to 112N can be, but are not limited to, 3D NAND, random access memory (RAM), read-only memory (ROM), dynamic random access memory (DRAM), synchronous dynamic random access memory (SDRAM), phase change memory (PCM), magnetoresistive random access memory (MRAM), NOR flash memory, electrically erasable programmable read-only memory (EEPROM), and a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write-in-place operation, where a non-volatile memory cell can be programmed without the non-volatile memory cell being previously erased. Furthermore, the memory cells of the memory components 112A to 112N can be grouped as memory pages, WLs, planes, blocks, or sub-blocks that can refer to a unit of the memory component 112 used to store data. In general, the memory pages, WLs, sub-blocks, and/or blocks are collectively or individually referred to as memory components.

The memory sub-system controller 115 can communicate with the memory components 112A to 112N to perform operations such as reading data, writing data, or erasing data at the memory components 112A to 112N and other such operations. The memory sub-system controller 115 can communicate with the memory components 112A to 112N to perform various memory management operations, such as different scan rates, different scan frequencies, different wear leveling, different read disturb management operations, such as read disturb scan operations, different near miss ECC operations, folding operations, preventing folding operations from being performed, and/or different dynamic data refresh operations.

The memory sub-system controller 115 can include hardware such as one or more integrated circuits and/or discrete components, one or more thermometers (used to measure a current operating temperature of the memory sub-system 110 and/or the memory components 112A to 112N or ambient temperature), a buffer memory, and/or a combination thereof.

The memory sub-system controller 115 can be a microcontroller, special-purpose logic circuitry (e.g., a field programmable gate array (FPGA), an application specific integrated circuit (ASIC), etc.), or another suitable processor. The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120. In some examples, the local memory 119 can include memory registers storing memory pointers, fetched data, and so forth. The local memory 119 can also include read-only memory (ROM) for storing microcode. While the example memory sub-system 110 in FIG. 1 has been illustrated as including the memory sub-system controller 115, in another example, a memory sub-system 110 may not include a memory sub-system controller 115, and can instead rely upon external control (e.g., provided by an external host, or by a processor 117 or controller separate from the memory sub-system 110).

In general, the memory sub-system controller 115 can receive commands or operations from the host system 120 and can convert the commands or operations into instructions or appropriate commands to achieve the desired access to the memory components 112A to 112N. In some examples, the commands or operations received from the host system 120 can specify configuration data for the memory components 112A to 112N.

The memory sub-system controller 115 can be responsible for other memory management operations, such as wear leveling operations, garbage collection operations, error detection and error-correcting code (ECC) operations, encryption operations, caching operations, media scans, data refreshing, read disturb operations, and address translations. The memory sub-system controller 115 can further include host interface circuitry to communicate with the host system 120 via the physical host interface. The host interface circuitry can convert the commands received from the host system 120 into command instructions to access the memory components 112A to 112N as well as convert responses associated with the memory components 112A to 112N into information for the host system 120.

The memory sub-system 110 can also include additional circuitry or components that are not illustrated. In some examples, the memory sub-system 110 can include a cache or buffer (e.g., DRAM or other temporary storage location or device) and address circuitry (e.g., a row decoder and a column decoder) that can receive an address from the memory sub-system controller 115 and decode the address to access the memory components 112A to 112N.

The memory devices can be raw memory devices (e.g., NAND), which are managed externally, for example, by an external controller (e.g., memory sub-system controller 115). The memory devices can be managed memory devices (e.g., managed NAND), which is a raw memory device combined with a local embedded controller (e.g., local media controllers) for memory management within the same memory device package. Any one of the memory components 112A to 112N can include a media controller (e.g., media controller 113A and media controller 113N) to manage the memory cells of the memory component (e.g., to perform one or more memory management operations), to communicate with the memory sub-system controller 115, and to execute memory requests (e.g., read or write) received from the memory sub-system controller 115.

The memory sub-system controller 115 can include a media operations manager 122. The media operations manager 122 can be configured to process multiple write requests received from a host system. The media operations manager 122 can receive a write request from a host system. The media operations manager 122 can aggregate the data received in that write request with data received from other write requests (e.g., previously received write requests or subsequently received write requests). If the data aggregated from the multiple write requests reaches a bundle unit size (e.g., 16 KB) before an internal read for a block of data is completed, the media operations manager 122 transfers the data directly to a portion of the memory components (e.g., immediately and without waiting for the internal read operation to complete). This expedites the process of satisfying multiple write requests for unaligned data which improves the overall efficiency of operating the memory sub-system 110.

Depending on the examples, the media operations manager 122 can comprise logic (e.g., a set of transitory or non-transitory machine instructions, such as firmware) or one or more components that causes the media operations manager 122 to perform operations described herein. The media operations manager 122 can comprise a tangible or non-tangible unit capable of performing operations described herein. Further details with regards to the operations of the media operations manager 122 are described below.

Figure 2:
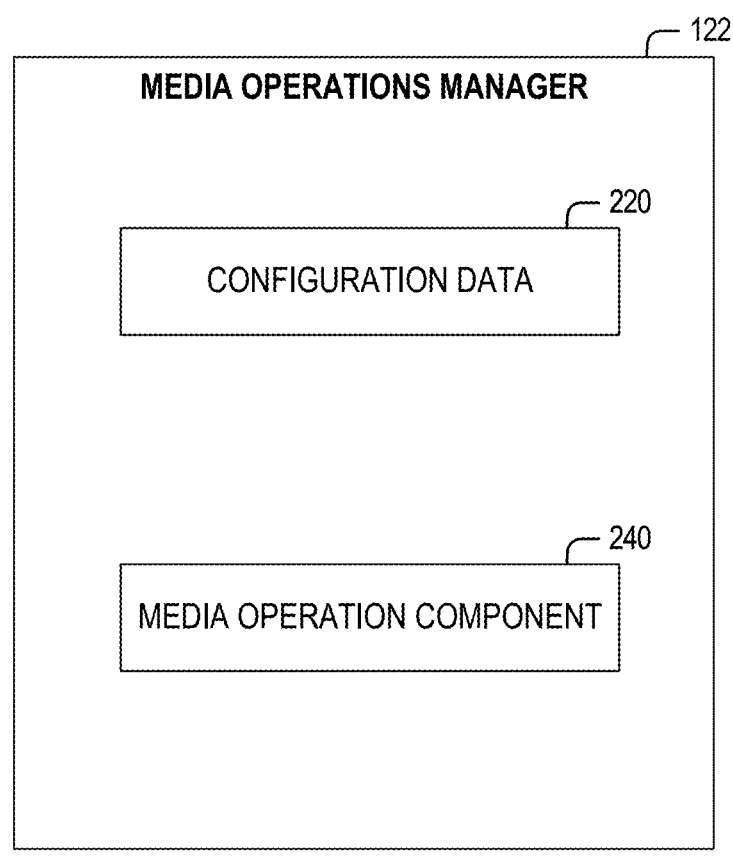
FIG. 2 is a block diagram of an example media operations manager, in accordance with some examples.

FIG. 2 is a block diagram of an example media operations manager 122 of FIG. 1, in accordance with some examples. As illustrated, the media operations manager 200 includes configuration data 220 and a media operation component 240. For some examples, the media operations manager 122 can differ in components or arrangement (e.g., less or fewer components) from what is illustrated in FIG. 2.

The configuration data 220 accesses and/or stores configuration data associated with the memory components 112A to 112N of FIG. 1. In some examples, the configuration data 220 is programmed into the media operations manager 122. For example, the media operations manager 122 can communicate with the memory components 112A to 112N to obtain the configuration data and store the configuration data 220 locally on the media operations manager 122. In some examples, the media operations manager 122 communicates with the host system 120 of FIG. 1. The host system 120 receives input from an operator or user that specifies parameters including a bundle unit (BU) size of portions of the set of memory components 112A to 112N. The disclosed techniques are described in the context of a 16 KB (kilobyte) BU size and with 4 KB/8 KB data chunks in write requests received by the host system 120 but are similarly applicable to any other BU size and any other data chunk size. The media operations manager 122 receives the configuration data from the host system 120 and stores the configuration data in the configuration data 220.

The media operation component 240 can receive multiple write requests and can aggregate the data received in those write requests into a single buffer (e.g., an aggregation cache). The media operation component 240 can determine whether the amount of data stored in the aggregation cache corresponds to a specified size (e.g., the BU size). Also, the media operation component 240 can determine whether amount of data stored in the aggregation cache reaches the specified size before an internal read for a memory block (or other portion) completes being satisfied. In such cases, the media operation component 240 can directly program the data from the aggregation cache into a portion of the set of memory components 112A to 112N without waiting for the internal read for the memory block to complete. This expedites satisfaction of write requests which improves the overall efficiency of operating the memory sub-system 110.

Figure 3:
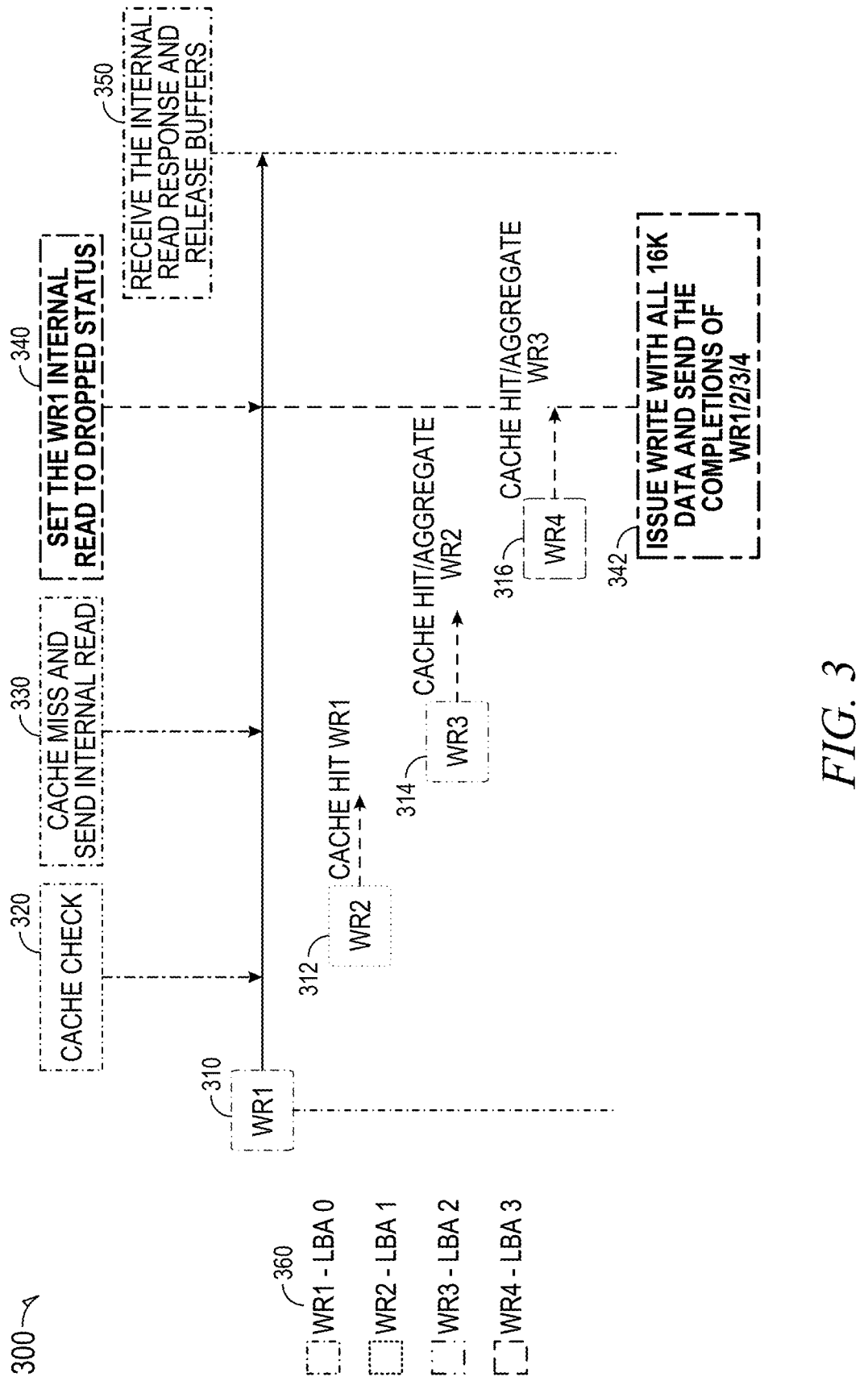
FIG. 3 is a timing diagram of operations performed by an example media operations manager, in accordance with some examples.

For example, as shown in the timing diagram 300 of FIG. 3, the media operation component 240 of FIG. 2 can receive a first write request 310 from the host system 120 (WR1) of FIG. 1. The first write request 310 can be associated with a first logical block address. The media operation component 240, in response to receiving the first write request 310, stores a first set of data of the first write request 310 in a first buffer. The media operation component 240 also checks the aggregation cache (e.g., one or more buffers that are storing data from previously received write requests) to determine whether additional space is available. For example, the aggregation cache can have a maximum size corresponding to the BU size of the set of memory components 112A to 112N of FIG. 1. The aggregation cache can store multiple transfer units (TUs) that include data received in one or more write requests from the host system 120.

If the media operation component 240 determines that the aggregation cache is empty or that there currently is no other buffers with previously received data stored, the media operation component 240 determines that there is an aggregation cache miss. In such cases, the media operation component 240 keeps the first set of data in the first buffer. Also, the media operation component 240 issues an internal read command 330 to retrieve a memory block (e.g., having a BU size) so that a read-modify-write operation can possibly be performed.

In some cases, the media operation component 240 determines that there is currently a buffer, such as a first buffer, for a previously received write request. For example, the media operation component 240 can receive a second write request 312 associated with a different logical block address than the first write request 310. In such cases, the media operation component 240 stores a second set of data for the second write request 312 in a second buffer. The media operation component 240 also searches for an aggregation cache (e.g., determines whether one or more sets of data are currently stored in one or more buffers). For example, the media operation component 240 can determine that the first buffer (generated in response to receiving the first write request 310) has space available for additional data of the second write request 312. In such cases, the media operation component 240 determines that there is a cache hit and prevents issuing an additional internal read operation.

The media operation component 240 can aggregate the first set of data stored in the first buffer with the second set of data of the second write request 312 in the second buffer. Namely, the media operation component 240 moves the first set of data from the first buffer to the second buffer. This can happen while the memory block is still waiting to be retrieved from the set of memory components 112A to 112N in response to the internal read operation. The media operation component 240 can determine whether the amount of data stored in the second buffer now corresponds to the BU size. If so, the media operation component 240 immediately and directly programs the data stored in the second buffer to a portion of the set of memory components 112A to 112N without waiting for the memory block to be retrieved (based on the internal read operation). When the memory block is ultimately retrieved, the media operation component 240 can disregard or discard the memory block.

In some cases, the media operation component 240 determines that the amount of data stored in the second buffer fails to correspond to the BU size. The media operation component 240 can receive a third write request 314. The third write request 314 can be associated with a different logical block address than the first write request 310 and the second write request 312. In such cases, the media operation component 240 stores a third set of data for the third write request 314 in a third buffer. The media operation component 240 also searches for an aggregation cache (e.g., determines whether one or more sets of data are currently stored in one or more buffers). For example, the media operation component 240 can determine that the second buffer has space available for additional data of the third write request 314. In such cases, the media operation component 240 determines that there is a cache hit and prevents issuing an additional internal read operation.

The media operation component 240 can aggregate the first set of data and the second set of data stored in the second buffer with the third set of data of the third write request 314 in the third buffer. Namely, the media operation component 240 moves the first set of data and the second set of data from the second buffer to the third buffer. This can happen while the memory block is still waiting to be retrieved from the set of memory components 112A to 112N in response to the internal read operation generated when the first write request 310 was received. In some cases, the media operation component 240 determines that the amount of data stored in the third buffer fails to correspond to the BU size. The media operation component 240 can receive a fourth write request 316 before the internal read operation completes being performed. The fourth write request 316 can be associated with a different logical block address than the first write request 310, the second write request 312, and the third write request 314. In such cases, the media operation component 240 stores a fourth set of data for the fourth write request 316 in a fourth buffer. The first, second, third, and fourth write requests 360 can correspond to different logical block addresses and are aggregated into a single buffer having the BU size.

Specifically, the media operation component 240 can aggregate the first set of data, the second set of data, and the third set of data stored in the third buffer with the fourth set of data of the fourth write request 316 in the fourth buffer. Namely, the media operation component 240 moves the first set of data, the second set of data, and the third set of data from the third buffer to the fourth buffer. This can happen while the memory block is still waiting to be retrieved from the set of memory components 112A to 112N in response to the internal read operation. The media operation component 240 can determine that the amount of data stored in the fourth buffer corresponds to the BU size. In response, the media operation component 240 generates a program command 342 to immediately and directly program the data stored in the fourth buffer to a portion of the set of memory components 112A to 112N without waiting for the memory block to be retrieved (based on the internal read operation). When the memory block is ultimately retrieved, the media operation component 240 can disregard or discard the memory block. Also, the media operation component 240 can set the internal read operation command to a dropped status 340. This can discard the memory block that is ultimately received 350 at which point the first, second, third and fourth buffers can be released and used for data received in other write requests.

FIG. 4 is a flow diagram of an example method 400 to perform media management operations, in accordance with some examples. The method 400 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some examples, the method 400 is performed by the media operations manager 122 of FIG. 1. Although the processes are shown in a particular sequence or order, unless otherwise specified, the order of the processes can be modified. Thus, the illustrated examples should be understood only as examples, and the illustrated processes can be performed in a different order, and some processes can be performed in parallel. Additionally, one or more processes can be omitted in various examples. Thus, not all processes are required in every example. Other process flows are possible.

Referring now to FIG. 4, the method (or process) 400 begins at operation 405 where the media operations manager 122 (e.g., the firmware of the memory sub-system 110) receives an individual write request from the host system 120 to program a set of data. The media operations manager 122 determines that an aggregation cache has space remaining for the set of data at operation 410. Then, at operation 415, the media operations manager 122 aggregates the set of data into the aggregation cache in response to determining that the aggregation cache has space remaining for the set of data. In response to determining that an amount of data stored in the aggregation cache has reached a specified size at operation 420, the media operations manager 122 transfers data stored in the aggregation cache to a portion of a set of memory components instead of modifying a block of data read from the set of memory components.

In view of the disclosure above, various examples are set forth below. It should be noted that one or more features of an example, taken in isolation or combination, should be considered within the disclosure of this application.

Example 1. A system comprising: a set of memory components of a memory sub-system; and a processing device operatively coupled to the set of memory components, the processing device being configured to perform operations comprising: receiving an individual write request from a host system to program a set of data; determining that an aggregation cache has space remaining for the set of data; aggregating the set of data into the aggregation cache in response to determining that the aggregation cache has space remaining for the set of data; and transferring data stored in the aggregation cache to a portion of the set of memory components instead of modifying a block of data read from the set of memory components in response to determining that an amount of data stored in the aggregation cache has reached a specified size.

Example 2. The system of Example 1, wherein the memory sub-system comprises a three-dimensional (3D) NAND device.

Example 3. The system of any one of Examples 1-2, wherein the set of data comprises 4 KB of data and the specified size comprises 16 KB of data.

Example 4. The system of any one of Examples 1-3, wherein the individual write request comprises a first write request, the operations comprising: generating an internal read request to obtain the block of data from the set of memory components in response to receiving the first write request.

Example 5. The system of Example 4, the operations comprising: storing the set of data in the aggregation cache in response to generating the internal read request.

Example 6. The system of Example 5, the operations comprising: receiving one or more write requests to program an additional set of data prior to completing the internal read request; and storing the additional set of data in the aggregation cache in response to determining that the aggregation cache has space remaining for the additional set of data.

Example 7. The system of Example 6, the operations comprising: determining that the amount of data stored in the aggregation cache has reached the specified size prior to completing the internal read request.

Example 8. The system of Example 7, the operations comprising: setting the internal read request to a dropped status to prevent completion of the internal read request in response to determining that the amount of data stored in the aggregation cache has reached the specified size prior to completing the internal read request.

Example 9. The system of Example 8, the operations comprising: transferring the data stored in the aggregation cache to the portion of the set of memory components without performing a read-modify-write operation in response to determining that the amount of data stored in the aggregation cache has reached the specified size prior to completing the internal read request.

Example 10. The system of any one of Examples 1-9, wherein the block of data comprises the specified size.

Example 11. The system of any one of Examples 1-10, wherein the specified size corresponds to a bundle unit of the set of memory components.

Example 12. The system of any one of Examples 1-11, wherein the bundle unit comprises multiple transfer units.

Example 13. The system of any one of Examples 1-12, the operations comprising: storing a first set of data of a first write request in a first buffer, the first write request comprising the individual write request; storing a second set of data of a second write request in a second buffer; storing a third set of data of a third write request in a third buffer; and combining the second set of data with the third set of data in the third buffer.

Example 14. The system of Example 13, the operations comprising: determining that the amount of data stored in the third buffer failed to reach the specified size prior to completion of reading the block of data; storing a fourth set of data of a fourth write request in a fourth buffer; and combining the first set of data with the second set of data, the third set of data, and the fourth set of data in the fourth buffer in response to determining that the amount of data stored in the third buffer failed to reach the specified size prior to completion of reading the block of data.

Example 15. The system of Example 14, the operations comprising: dropping a request to read the block of data; and transferring data stored in the fourth buffer to the portion of the set of memory components in response to determining that the fourth buffer reached the specified size.

Methods and computer-readable storage medium with instructions for performing any one of the above examples are provided as follows.

Figure 5:
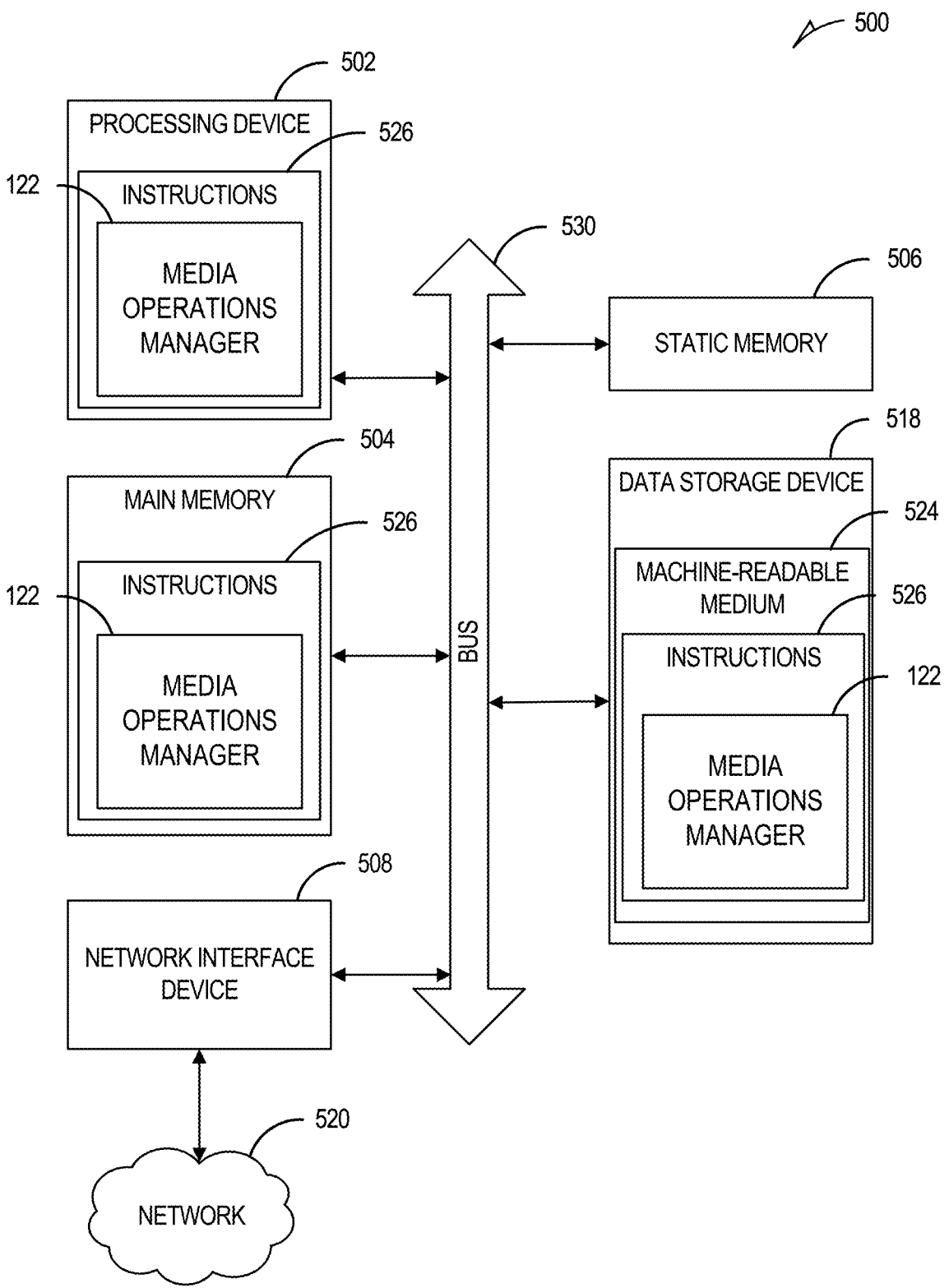
FIG. 5 is a block diagram illustrating a diagrammatic representation of a machine in the form of a computer system within which a set of instructions can be executed for causing the machine to perform any one or more of the methodologies discussed herein, in accordance with some examples.

FIG. 5 illustrates an example machine in the form of a computer system 500 within which a set of instructions can be executed for causing the machine to perform any one or more of the methodologies discussed herein. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the media operations manager 122 of FIG. 1). In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a network switch, a network bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

The processing device 502 represents one or more general-purpose processing devices such as a microprocessor, a central processing unit, or the like. More particularly, the processing device 502 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 502 can also be one or more special-purpose processing devices such as an application specific integrated circuit (ASIC), a field programmable gate array (FPGA), a digital signal processor (DSP), a network processor, or the like. The processing device 502 is configured to execute instructions 526 for performing the operations and steps discussed herein. The computer system 500 can further include a network interface device 508 to communicate over a network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one example, the instructions 526 implement functionality corresponding to the media operations manager 122 of FIG. 1. While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system's memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks; read-only memories (ROMs); random access memories (RAMs); erasable programmable read-only memories (EPROMs); EEPROMs; magnetic or optical cards; or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description above. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine-readable (e.g., computer-readable) storage medium such as a read-only memory (ROM), random access memory (RAM), magnetic disk storage media, optical storage media, flash memory components, and so forth.

In the foregoing specification, examples of the disclosure have been described with reference to specific example embodiments thereof. It will be evident that various modifications can be made thereto without departing from the broader examples of the disclosure as set forth in the following claims. The specification and drawings are, accordingly, to be regarded in an illustrative sense rather than a restrictive sense.

What is claimed is:

1. A system comprising:
a set of memory components of a memory sub-system; and
a processing device operatively coupled to the set of memory components, the processing device programmed to cause the system to perform operations comprising:
receiving an individual write request from a host system to program a set of data, the individual write request triggering an internal read request;
determining that an aggregation cache has space remaining for the set of data;
aggregating the set of data into the aggregation cache based on determining that the aggregation cache has space remaining for the set of data;
setting the internal read request to a dropped status to prevent completion of the internal read request based on determining that an amount of data stored in the aggregation cache has reached a specified size prior to completing the internal read request; and
transferring data stored in the aggregation cache to a portion of a set of memory components instead of modifying a block of data associated with the internal read request based on determining that amount of data stored in the aggregation cache has reached the specified size.

2. The system of claim 1, wherein the memory sub-system comprises a three-dimensional (3D) NAND device.

3. The system of claim 1, wherein the set of data comprises 4 KB of data and the specified size comprises 16 KB of data.

4. The system of claim 1, wherein the individual write request comprises a first write request, the operations comprising:

generating the internal read request to obtain the block of data from the set of memory components in response to receiving the first write request.

5. The system of claim 4, the operations comprising:
storing the set of data in the aggregation cache in response to generating the internal read request.

6. The system of claim 5, the operations comprising:
receiving one or more write requests to program an additional set of data prior to completing the internal read request; and
storing the additional set of data in the aggregation cache in response to determining that the aggregation cache has space remaining for the additional set of data.

7. The system of claim 6, the operations comprising:
determining that the amount of data stored in the aggregation cache has reached the specified size prior to completing the internal read request.

8. The system of claim 1, the operations comprising:
transferring the data stored in the aggregation cache to the portion of the set of memory components without performing a read-modify-write operation in response to determining that the amount of data stored in the aggregation cache has reached the specified size prior to completing the internal read request.

9. The system of claim 1, wherein the block of data comprises the specified size.

10. The system of claim 1, wherein the specified size corresponds to a bundle unit of the set of memory components.

11. The system of claim 10, wherein the bundle unit comprises multiple transfer units.

12. The system of claim 1, the operations comprising:
storing a first set of data of a first write request in a first buffer, the first write request comprising the individual write request;
storing a second set of data of a second write request in a second buffer;
storing a third set of data of a third write request in a third buffer; and
combining the second set of data with the third set of data in the third buffer.

13. The system of claim 12, the operations comprising:
determining that the amount of data stored in the third buffer failed to reach the specified size prior to completion of reading the block of data;
storing a fourth set of data of a fourth write request in a fourth buffer; and
combining the first set of data with the second set of data, the third set of data, and the fourth set of data in the fourth buffer in response to determining that the amount of data stored in the third buffer failed to reach the specified size prior to completion of reading the block of data.

14. The system of claim 13, the operations comprising:
dropping a request to read the block of data; and
transferring data stored in the fourth buffer to the portion of the set of memory components in response to determining that the fourth buffer reached the specified size.

15. A method comprising:
receiving an individual write request from a host system to program a set of data, the individual write request triggering an internal read request;
determining that an aggregation cache has space remaining for the set of data;

aggregating the set of data into the aggregation cache based on determining that the aggregation cache has space remaining for the set of data;

setting the internal read request to a dropped status to prevent completion of the internal read request based on determining that an amount of data stored in the aggregation cache has reached a specified size prior to completing the internal read request; and transferring data stored in the aggregation cache to a portion of a set of memory components instead of modifying a block of data read associated with the internal read request based on determining that the amount of data stored in the aggregation cache has reached the specified size.

16. The method of claim 15, wherein a memory subsystem comprising the set of memory components comprises a three-dimensional (3D) NAND device.

17. The method of claim 15, wherein the set of data comprises 4 KB of data and the specified size comprises 16 KB of data.

18. The method of claim 15, wherein the individual write request comprises a first write request, comprising:

generating an internal read request to obtain the block of data from the set of memory components in response to receiving the first write request.

19. A non-transitory computer-readable storage medium comprising instructions that, when executed by a processing device, cause the processing device to perform operations comprising:

receiving an individual write request from a host system to program a set of data, the individual write request triggering an internal read request;

determining that an aggregation cache has space remaining for the set of data;

aggregating the set of data into the aggregation cache based on determining that the aggregation cache has space remaining for the set of data;

setting the internal read request to a dropped status to prevent completion of the internal read request based on determining that an amount of data stored in the aggregation cache has reached a specified size prior to completing the internal read request; and transferring data stored in the aggregation cache to a portion of a set of memory components instead of modifying a block of data associated with the internal read request based on determining that the amount of data stored in the aggregation cache has reached the specified size.

20. The non-transitory computer-readable storage medium of claim 19, wherein the set of data comprises 4 KB of data and the specified size comrises 16 KB of data.

* * * * *